(12) United States Patent
Huang

(10) Patent No.: US 7,848,864 B2
(45) Date of Patent: Dec. 7, 2010

(54) SYSTEM FOR ESTIMATING VEHICLE STATES FOR ROLLOVER REDUCTION

(75) Inventor: Jihua Huang, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 452 days.

(21) Appl. No.: 11/744,969

(22) Filed: May 7, 2007

(65) Prior Publication Data

US 2008/0281482 A1 Nov. 13, 2008

(51) Int. Cl.
*G06F 17/00* (2006.01)

(52) U.S. Cl. ............... 701/37; 701/1; 701/34; 701/36; 701/38; 701/41; 180/271; 180/282; 280/5.502; 280/755; 303/130; 303/140; 303/146; 303/189

(58) Field of Classification Search .................. None
See application file for complete search history.

(56) References Cited

U.S. PATENT DOCUMENTS

| | | | | |
|---|---|---|---|---|
| 5,274,576 A | * | 12/1993 | Williams | 707/5 |
| 6,002,975 A | * | 12/1999 | Schiffmann et al. | 701/36 |
| 6,263,261 B1 | * | 7/2001 | Brown et al. | 701/1 |
| 6,816,799 B2 | * | 11/2004 | Yu et al. | 702/94 |
| 7,103,460 B1 | * | 9/2006 | Breed | 701/29 |
| 7,110,870 B2 | * | 9/2006 | Tseng et al. | 701/34 |
| 7,158,866 B2 | * | 1/2007 | Gustafsson et al. | 701/1 |
| 7,206,679 B2 | * | 4/2007 | Schubert et al. | 701/38 |
| 7,222,007 B2 | * | 5/2007 | Xu et al. | 701/38 |
| 7,239,949 B2 | * | 7/2007 | Lu et al. | 701/45 |
| 2004/0059480 A1 | * | 3/2004 | Hrovat et al. | 701/34 |
| 2004/0181329 A1 | * | 9/2004 | Tseng et al. | 701/38 |
| 2005/0080543 A1 | * | 4/2005 | Lu et al. | 701/70 |
| 2005/0149240 A1 | * | 7/2005 | Tseng et al. | 701/38 |

* cited by examiner

*Primary Examiner*—Khoi Tran
*Assistant Examiner*—Jonathan L Sample
(74) *Attorney, Agent, or Firm*—John A. Miller; Miller IP Group, PLC

(57) ABSTRACT

A system and method for estimating vehicle states, such as vehicle roll-rate, vehicle roll angle, vehicle lateral velocity and vehicle yaw-rate, for use in rollover reduction. The system includes an extended Kalman filter observer responsive to a steering angle signal, a yaw-rate signal, a roll-rate signal, a speed signal and a lateral acceleration signal that calculates an estimated yaw-rate signal, an estimated roll-rate, an estimated roll angle and an estimated lateral velocity. The system also includes a lateral velocity estimation processor responsive to the roll-rate signal, the estimated roll angle signal, the estimated lateral velocity signal and the lateral acceleration signal that calculates a modified lateral velocity estimation signal when the vehicle is operating in a non-linear region.

22 Claims, 2 Drawing Sheets

SYSTEM FOR ESTIMATING VEHICLE STATES FOR ROLLOVER REDUCTION

BACKGROUND OF THE INVENTION

1. Field of the Invention

This invention relates generally to a system and method for estimating vehicle states and, more particularly, to a system and method for estimating vehicle roll-rate, vehicle roll angle, vehicle lateral velocity and vehicle yaw-rate for rollover reduction purposes.

2. Discussion of the Related Art

It is known in the art to provide vehicle control enhancement using differential braking control, rear-wheel steering control, front-wheel steering control, or any combination thereof to help prevent a vehicle from encountering conditions that present an increased possibility of rollover. These systems may receive vehicle dynamics information from various sensors, such as yaw rate sensors, lateral acceleration sensors and tire/wheel sensors to determine the proper control action. These systems may also incorporate roll-rate sensors and roll angle estimation features in order to estimate rollover possibility during a maneuver and provide responsive control enhancement. A balance typically needs to be provided between controlling the vehicle roll motion and the vehicle yaw motion to provide improved vehicle response. Thus, it is usually necessary to detect certain vehicle conditions to provide improved vehicle control enhancement.

Vehicle enhancement control can be designed using output feedback. However, typically state-feedback based designs generally can provide more freedom in design and achieve higher potentials in performance. Furthermore, activation of vehicle control usually requires monitoring of vehicle states. However, in many cases, not all of the vehicle states are measured because of various disadvantages, such as sensor costs, implementation difficulties, etc. Therefore, it is common to estimate vehicle states for rollover reduction purposes.

Estimation of vehicle states, such as yaw-rate, lateral velocity and roll-rate has been investigated in the art for the development of vehicle stability enhancement in the yaw plane. Because of this, the focus has been on the estimation of the vehicle lateral motion instead of the roll motion, which is of particular interest in rollover reduction.

SUMMARY OF THE INVENTION

In accordance with the teachings of the present invention, a system and method are disclosed for estimating vehicle states, such as vehicle roll-rate, vehicle roll angle, vehicle lateral velocity and vehicle yaw-rate. The system uses a steering angle sensor for measuring a steering angle signal of a steering angle of the vehicle, a yaw-rate sensor for measuring a yaw-rate signal of the yaw-rate of the vehicle, a roll-rate sensor for measuring a roll-rate signal of the roll-rate of the vehicle, a speed sensor for measuring a speed signal of the speed of the vehicle, and a lateral acceleration sensor for measuring a lateral acceleration signal of the lateral acceleration of the vehicle. The system includes an extended Kalman filter observer responsive to the steering angle signal, the yaw-rate signal, the roll-rate signal, the speed signal and the lateral acceleration signal that calculates an estimated yaw-rate signal, an estimated roll-rate, an estimated roll angle and an estimated lateral velocity. The system also includes a lateral velocity estimation processor responsive to the roll-rate signal, the estimated roll angle signal, the estimated lateral velocity signal and the lateral acceleration signal that calculates a modified lateral velocity estimation signal when the vehicle is operating in a non-linear region.

The system can also include a sensor pre-filtering processor that filters out a low-frequency component of the signals, and estimates a sensor bias based on the low-frequency component for the steering angle signal, the yaw-rate signal, the roll-rate signal, the speed signal and the lateral acceleration signal.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for estimating vehicle states for vehicle rollover reduction purposes is merely exemplary in nature, and is in no way intended to limit the invention or its applications or uses. For example, the system and method are used to estimate vehicle states for rollover reduction purposes. However, the system and method of the invention may be used to estimate vehicle states for other applications.

The present invention includes a system and method that use various vehicle sensors to estimate vehicle states to provide rollover reduction. The main challenge for state estimation for rollover reduction comes from the non-linearity of vehicle dynamics, especially when the vehicle is at a near rollover condition. During cornering maneuvers, vehicle yaw motion produces the lateral acceleration that causes the vehicle to roll. The roll motion introduces a lateral load transfer that causes the tire cornering force to change, which alters the yaw response. As the lateral acceleration gets larger and the vehicle roll motion becomes more severe, both the vehicle suspension and tires enter a non-linear region. Although there are non-linear models that try to model these vehicle non-linearities, linear models are usually preferred for estimation and control purposes. The present invention proposes using a linear-region based estimation when the vehicle is operating in the linear region, and then extending the estimation of the non-linear region by adding complimentary estimation modules.

For the following discussion, the following nomenclature will be used:

$M_u$ unsprung mass;
$M_s$ sprung mass;
$V_y$ lateral velocity;
$\gamma$ yaw-rate;
$p$ roll-rate;
$\phi$ roll angle;
$\delta_f$ front steering angle;
$I_x$ roll moment of inertia of the sprung mass;
$I_z$ yaw moment of inertia of the whole vehicle;
$I_{xz}$ the sprung mass product of inertia about the x and z axes with the added effect of roll axis inclination;

a distance from the center of gravity (CG) of the sprung mass to the front axis;
b distance from the CG of the sprung mass to the rear axis;
$h_s$ height of the sprung mass CG above the roll axis;
$C_f$ cornering stiffness of the front tires;
$C_r$ cornering stiffness of the rear tires;
$K_\phi$ roll stiffness coefficients;
$C_\phi$ roll damping coefficients;
$A_1$ first rows of the A matrix in equation (1);
$B_1$ first rows of the B matrix in equation (1);
$\lambda$ forgetting factor;
$X(i)$ input measurement;
$d(i)$ output measurement;
w coefficients (i.e., sensor bias in the invention); and
$a_{ym}$ lateral accelerometer measurement.

Figure 1:
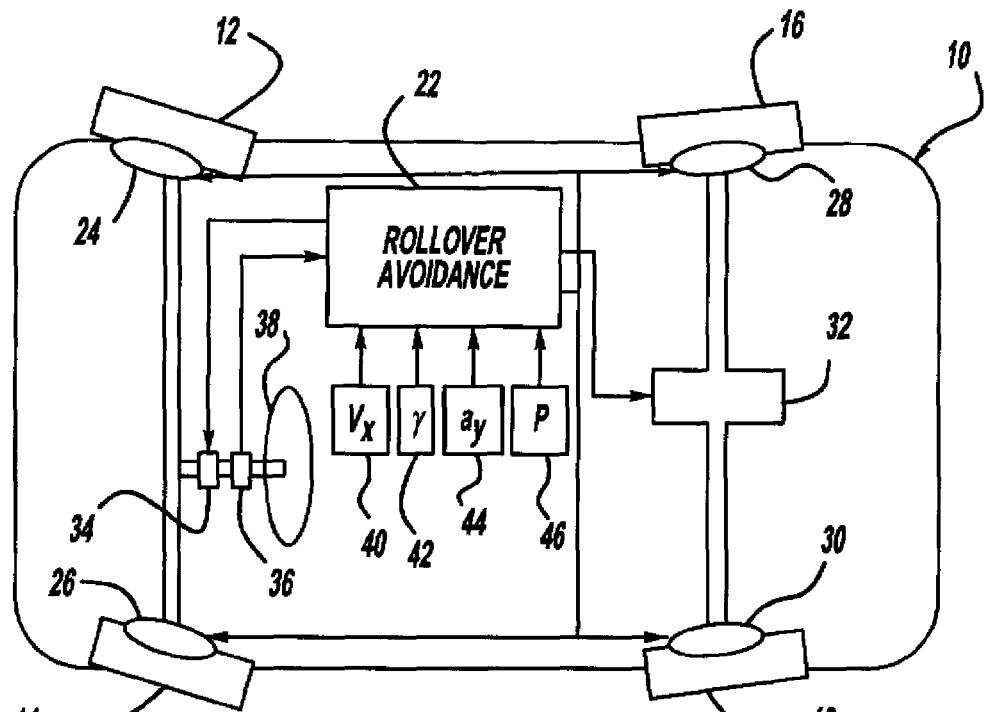
FIG. 1 is a plan view of a vehicle including a rollover reduction system.

FIG. 1 is a plan view of a vehicle 10 including front wheels 12 and 14 and rear wheels 16 and 18. The vehicle 10 also includes a rollover reduction controller 22 that provides vehicle rollover reduction. The controller 22 can provide control signals to various actuators on the vehicle 10 to provide the control, such as differential braking for braking actuators 24, 26, 28 and 30 of the wheels 12, 14, 16 and 18, respectively, an active rear-wheel steering control actuator 32 and an active front-wheel steering control actuator 34, all of which are well known to those skilled in the art. The controller 22 receives signals relating to various vehicle states from various sensors, including a hand-wheel angle sensor 36 for measuring the angle of a vehicle hand-wheel 38 to provide a signal $\delta$ indicative of the steering angle of the front wheels 12 and 14. The controller 22 also receives a vehicle speed signal $v_x$ from a vehicle speed sensor 40, a yaw-rate signal $\gamma$ from a yaw-rate sensor 42, a lateral acceleration signal $a_y$ from a lateral acceleration sensor 44 and a roll-rate signal p from a roll-rate sensor 46, all of which are well known to those skilled in the art.

Figure 2:
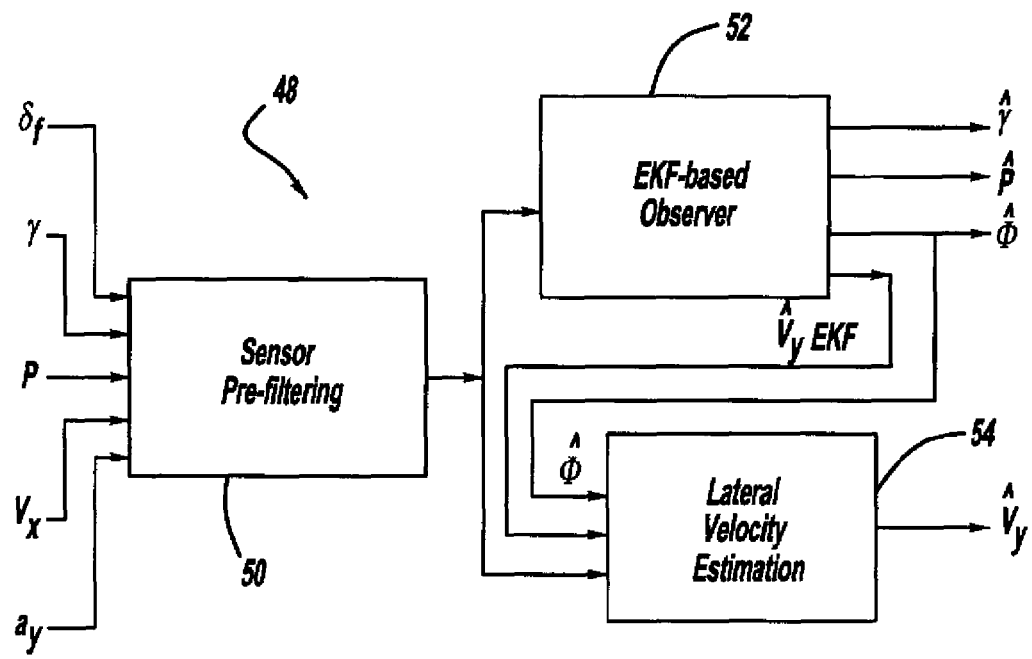
FIG. 2 is a block diagram of a system for estimating vehicle states used in the rollover reduction system of FIG. 1.

FIG. 2 is a block diagram of a state estimation system 48 that is used in the controller 22, according to an embodiment of the present invention. The steering angle signal $\delta$, the yaw-rate signal $\gamma$, the roll-rate signal p, the vehicle speed signal $v_x$ and the vehicle lateral acceleration signal $a_y$ are applied to a sensor pre-filtering processor 50 that provides sensor signal filtering, discussed in more detail below.

The filtered sensor signals from the pre-filtering processor 50 are sent to an extended Kalman filter (EKF) based observer 52. Because a Kalman filter employs a powerful model-based estimation algorithm, it is employed as a linear-region based core estimator. Because the vehicle model is actually linearly time varying, an extended Kalman filter is used. From the sensor signals, the observer 52 calculates a yaw-rate estimation signal $\hat{\delta}$, a roll-rate estimation signal $\hat{p}$, a roll angle estimation signal $\hat{\phi}$ and a lateral velocity estimation signal $\hat{v}_y$. Because the standard design of an EKF observer is well known to those skilled in the art, it does not need to be described in further detail.

As will be discussed in detail below, the EKF-based observer 52 is generally not accurate enough to estimate the lateral velocity in the non-linear region. Therefore, a side-slip or lateral velocity estimation processor 54 is included to enhance the calculation of the lateral velocity estimation signal $\hat{v}_y$. The lateral velocity estimation processor 54 receives the filtered roll-rate signal from the pre-filtering processor 50, the roll angle estimation signal $\hat{\phi}$ from the observer 52, the lateral velocity estimation signal $\hat{v}_y$ from the observer 52 and the lateral acceleration signal $a_y$ to provide the modified estimation of the lateral velocity when the vehicle is in the non-linear range.

The sprung mass of a vehicle is usually treated as a rigid body with six degrees-of-freedom, which consists of the longitudinal, lateral, vertical, yaw, roll and pitch motions. For vehicle rollover reduction, the lateral, yaw and roll motions are of primary interest, and thus, a three degree-of-freedom linear yaw/side-slip/roll model has been developed in the art for this purposes.

Figure 3:
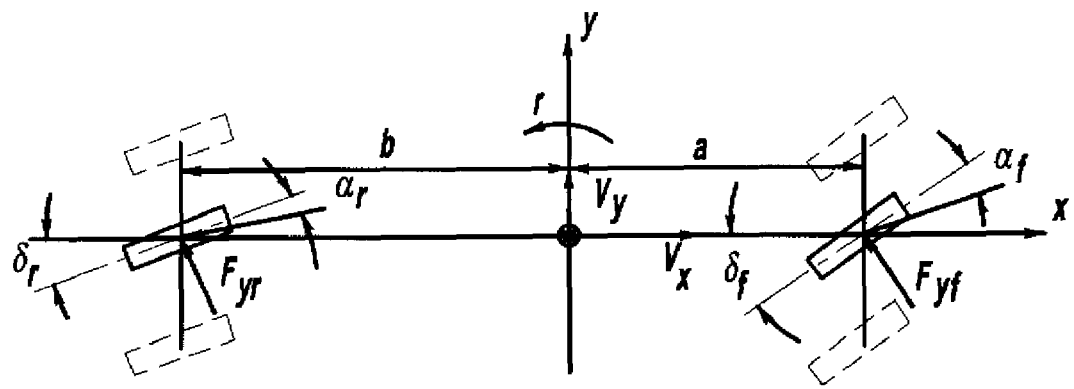
FIG. 3 is a top plan view of a vehicle showing variables used in a three degree-of-freedom of vehicle model.
Figure 4:
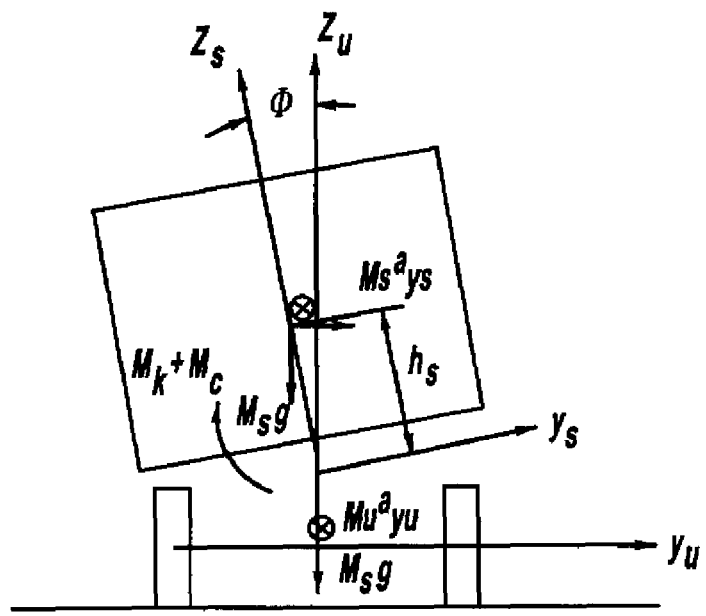
FIG. 4 is a front view of a vehicle showing the variables used in a three degree-of-freedom of vehicle model.

FIG. 3 is a top plan view and FIG. 4 is a front view of a vehicle showing variables that are used in the three degree-of-freedom vehicle model for state estimation. These figures show a vehicle as a two-mass system consisting of an unsprung mass $M_u$ and a sprung mass $M_s$, which is constrained to roll about a roll axis.

From the three degree-of-freedom model, the following equations are known.

$$\dot{X} = AX + BU \tag{1}$$

$$X = [v_y \quad r \quad p \quad \phi]^T \tag{2}$$

$$U = \delta_f \tag{3}$$

$$A = M_m^{-1} \begin{bmatrix} -\dfrac{C_f + C_r}{v_x} & -\dfrac{aC_f - bC_r}{v_x} - Mv_x & 0 & C_f\gamma_f + C_r\lambda_r \\ -\dfrac{aC_f - bC_r}{v_x} & -\dfrac{a^2 C_f - b^2 C_r}{v_x} & 0 & aC_f\gamma_f - bC_r\gamma_r \\ 0 & M_s h_s v_x & -C_\phi & M_s g h_s - K_\phi \\ 0 & 0 & 1 & 0 \end{bmatrix} \tag{4}$$

$$B = M_m^{-1} \begin{bmatrix} C_f \\ aC_f \\ 0 \\ 0 \end{bmatrix} \tag{5}$$

$$M_m = \begin{bmatrix} M & 0 & -M_s h_s & 0 \\ 0 & I_z & I_{xz} & 0 \\ -M_s h_s & I_{xz} & I_x & 0 \\ 0 & 0 & 0 & 1 \end{bmatrix} \tag{6}$$

The sensor pre-filtering processor 50 is used to approximately remove the biases in inertia sensors, such as the yaw sensor 42, the roll-rate sensor 46 and the lateral acceleration sensor 44. Generally, sensor biases are a slowly-drifting low-frequency signal. Therefore, it is straightforward to filter out the low-frequency component of a sensor output for bias removal. However, this is only advantageous if the proper sensor output signal does not contain any low-frequency components. In some cases, such as during a steady-state turn, both the yaw-rate and the lateral acceleration can be constant producing low-frequency outputs. Hence, it is necessary to differentiate the low-frequency component due to steady-state behavior and the low-frequency component due to sensor biases.

According to the invention, the sensor signal pre-filtering uses two steps. First, the processor 50 determines situations where the low-frequency component in the signal contains sensor biases only, and filters out the corresponding low-frequency component. Second, the processor 50 estimates the bias based on the resulting low-frequency component.

In one embodiment, a recursive least square (RLS) technique is employed in the bias estimation. Though the standard RLS technique is well known, the present invention uses a modified version of the RLS technique, i.e., an RLS technique with a variable forgetting factor $\lambda$. It has been observed that after a large yaw-rate maneuver, the bias of the yaw-rate sensor 42 can be quite different than the sensor bias before the maneuver. According to the invention, the variable forgetting factor λ is used to allow fast tracking of the large variation without corrupting the generally slow-drifting characteristics of the bias.

For estimating the sensor bias, the following RLS equations can be used, according to the invention:

$$w_n = w_{n-1} + \frac{P(n-1)}{\lambda(n-1) + P(n-1)}(d(n) - w_{n-1}) \quad (7)$$

$$P(n) = \frac{P(n-1)}{\lambda(n-1) + P(n-1)}, \quad (8)$$

with
$P(0) = 1$

Where $w_n$ is the bias estimation, $d(n)$ is the filtered low-frequency component and $\lambda(n) \epsilon (0\ 1)$ is the variable forgetting factor, i.e., between 0 and 1. For example, for the estimation of the bias in yaw-rate measurement, $w_n$ represents the bias estimate and $d(n)$ is the filtered yaw-rate. The forgetting factor λ is determined based on the error between low-frequency components of the sensor signal and the estimated bias. If the error is relatively large, then the forgetting factor $\lambda(n)$ is chosen to be small so that the estimated bias can quickly catch up with recent measurements. If the error is relatively small, then the forgetting factor $\lambda(n)$ is chosen to be closer to 1 so that the estimated bias can only vary slowly.

The EKF-based observer 52 is designed based on the discrete-time version of the three degree-of-freedom model. The EKF-based observer 52 uses the steering angle signal δ as the input, the vehicle speed signal $v_x$ as a parameter in the model and the yaw-rate γ, the roll-rate signal p and the lateral acceleration signal $a_y$ as the output. The equations used in the Kalman filter can be:

$$\hat{X}(t_k)^- = f(\hat{X}(t_{k-1}), u(t_k), t_k) \quad (9)$$

$$P^-(t_k) = F(t_k)P(t_{k-1})F^T(t_k) + Q_d(t_{k-1}) \quad (10)$$

$$K(t_k) = P^-(t_k)H^T(t_k)[R(t_k) + H(t_k)P^-(t_k)H^T(t_k)]^{-1} \quad (11)$$

$$\hat{X}(t_k) = X(t_k)^- + K(t_k)(Y_m(t_k) - h(\hat{X}(t_k)t_k)) \quad (12)$$

$$P(t_k) = [I - K(t_k)H(t_k)]P^-(t_k) \quad (13)$$

Where, $$F(t_k) = \frac{\partial f}{\partial X}\bigg|_{X=\hat{X}(t_k)} = A_k(t_k) \quad (14)$$

$$H(t_k) = \frac{\partial h}{\partial x}\bigg|_{X=\hat{X}(t_k)} \quad (15)$$

The output measurements are $h(X) = [a_y\ r\ p]^T$, $Q_d$ is the input covariance matrix and R is the output covariance matrix. Further, $\hat{X}(t_k)^-$ is a priori state estimate at step k, and $\hat{X}(t_k)$ is a posteriori state estimate at step k.

According to the invention, the EKF-based observer 52 uses an additional scheduling of the feedback gains. As the roll motion becomes more severe, for example, when either the roll-rate $p > p_{th}$ or the roll angle $\phi > \phi_{th}$ with $p_{th}$=2 deg/sec and $\phi_{th}$=3 deg$^1$, the non-linearity of the vehicle dynamics cannot be ignored and the accuracy of a three degree-of-freedom model can decrease dramatically. To reduce the effect of the model inaccuracy on the vehicle state estimates calculated by the EKF observer 52, further scheduling of the feedback gains are added by manipulating the input and output covariance matrices used in the filtering. First, the input covariance matrix $Q_d$ is increased to reflect the increase in model inaccuracy. Second, because the lateral motion based on the three degree-of-freedom model, i.e., $\dot{v}_y = A_1 X - B_1 U$, where $A_1$ and $B_1$ are the first rows of the system matrices A and B in equation (1), respectively, no longer approximates the actual lateral motion when vehicle roll motion is relative severe, the output equation for the lateral acceleration sensor measurement does not hold in those conditions. Therefore, the output covariance R corresponding to the lateral acceleration signal is increased so that the EKF observer 52 makes little use of it. Such scheduling of the input and output covariance matrices can be some function of the lateral acceleration, the vehicle yaw-rate, the vehicle speed or the vehicle roll-rate.

The lateral acceleration signal $a_y$ from the sensor 44 can be used to determine when the vehicle goes between a linear operating condition and a non-linear operating condition, based on vehicle side-slip. The roll-rate signal P and the roll angle signal $\hat{\phi}$ can also be used to determine when the vehicle goes into the non-linear region. When the vehicle goes from the linear operating region to the non-linear operating region, the algorithm will change the input covariance matrix $Q_d$. When the vehicle is operating in the linear range, the EKF-based observer 52 calculates the lateral velocity estimation signal accurately, which is passed through the lateral velocity estimation processor 54. However, when the vehicle is operating in the non-linear region, the EKF-based observer 52 does not provide an accurate enough estimation of the lateral velocity, and thus, the lateral velocity estimation processor 54 is used to modify the estimated lateral velocity signal.

Because the lateral motion in the three degree-of-freedom model is not valid during severe roll motions, for example, when either the roll-rate $p > p_{th}$ or the roll angle $\phi > \phi_{th}$ with $p_{th}$=2 deg/sec and $\phi_{th}$=3 deg$^1$, the lateral velocity has to be estimated by another process in the lateral velocity estimation processor 54. Because the equation $a_{ym} = \hat{v}_y + \gamma v_x + g \sin \phi$ is always valid, the lateral acceleration can be used to estimate the lateral velocity directly. Using the yaw-rate estimation signal $\hat{\gamma}$ and the roll-rate estimation signal $\hat{p}$ from the EKF-based observer 52, the derivative of the lateral velocity can be calculated as $\hat{\dot{v}}_y = a_{ym} - \gamma v_x - g \sin \phi$. Therefore:

$$v_y = \int (a_{ym} - \gamma v_x - g \sin \phi) dt \quad (16)$$

This integration-based estimation provided by the lateral velocity estimation processor 54 is mainly active during severe roll motions. In the linear region, the lateral velocity is estimated directly by the EKF-based observer 52, that is, $\hat{v} = \hat{v}_{yEKF}$.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for estimating vehicle states of yaw-rate, roll-rate, roll angle and lateral velocity, said system comprising:
   a steering angle sensor providing a steering angle signal of a steering angle of the vehicle;
   a yaw-rate sensor for providing a yaw-rate signal of the yaw-rate of the vehicle;
   a roll-rate sensor for providing a roll-rate signal of the roll-rate of the vehicle;

a speed sensor for providing a speed signal of the speed of the vehicle;

a lateral acceleration sensor for providing a lateral acceleration signal of the lateral acceleration of the vehicle;

a Kalman filter observer responsive to the steering angle signal, the yaw-rate signal, the roll-rate signal, the speed signal and the lateral acceleration signal, said observer using Kalman filtering to provide an estimated yaw-rate signal, an estimated roll-rate, an estimated roll angle and an estimated lateral acceleration; and a lateral velocity estimation processor responsive to the roll-rate signal, the estimated roll angle signal, the estimated lateral velocity signal and the lateral acceleration signal, said lateral velocity estimation processor calculating a modified lateral velocity estimation signal when the vehicle is operating in a non-linear region.

2. The system according to claim 1 wherein the Kalman filter observer changes a covariance matrix in the filter when the vehicle goes from a linear to a non-linear operating region.

3. The system according to claim 1 wherein the Kalman filter observer uses a three degree-of-freedom model.

4. The system according to claim 1 further comprising a sensor pre-filtering processor responsive to the steering angle signal, the yaw-rate signal, the roll-rate signal, the speed signal and the lateral acceleration signal, said sensor pre-filtering processor filtering out a low-frequency component of the signals, and estimating a sensor bias based on the low-frequency component.

5. The system according to claim 4 wherein the sensor pre-filtering processor uses a recursive least squares technique to provide the sensor bias estimation.

6. The system according to claim 4 wherein the sensor pre-filtering processor employs a variable forgetting factor that is a value between 0 and 1 and is set based on an error between the low-frequency component of the sensor signal and an estimated bias of the sensor.

7. The system according to claim 1 wherein the lateral velocity estimation processor integrates the lateral velocity to modify the lateral velocity estimation signal.

8. The system according to claim 7 wherein the lateral velocity estimation processor uses the following equation to determine the modified estimated lateral acceleration signal:

$$v_y = \int (a_{ym} - \gamma v_x - g \sin \phi) dt$$

where $v_y$ is the lateral velocity, $a_{ym}$ is the lateral acceleration, $\gamma$ is the yaw-rate, $v_x$ is the vehicle speed and g is the gravitational constant.

9. The system according to claim 1 wherein the system is used to estimate vehicle states for vehicle rollover reduction.

10. The system according to claim 1 wherein the system uses the lateral acceleration signal, the roll-rate signal or the roll angle signal to determine whether the vehicle is in the non-linear operating region.

11. A system for estimating vehicle states, said system comprising:

a plurality of sensors for measuring vehicle states and providing sensor signals;

a Kalman filter observer responsive to sensor signals, said observer providing estimated vehicle states; and a lateral velocity estimation processor responsive to some of the sensor signals and some of the estimated vehicle states, said lateral velocity estimation processor calculating a modified lateral velocity estimation signal when the vehicle is operating in a non-linear region.

12. The system according to claim 11 wherein the Kalman filter observer changes a covariance matrix in the filter when the vehicle goes from a linear to a non-linear operating region.

13. The system according to claim 11 wherein the Kalman filter observer uses a three degree-of-freedom model.

14. The system according to claim 11 further comprising a sensor pre-filtering processor responsive to the sensor signals, said sensor pre-filtering processor filtering out a low-frequency component of the signals, and estimating a sensor bias based on the low-frequency component.

15. The system according to claim 14 wherein the sensor pre-filtering processor uses a recursive least squares technique to provide the sensor bias estimation.

16. The system according to claim 14 wherein the sensor pre-filtering processor employs a variable forgetting factor that is a value between 0 and 1 and is set based on an error between the low-frequency component of the sensor signal and an estimated bias of the sensor.

17. The system according to claim 11 wherein the lateral velocity estimation processor integrates the lateral velocity to modify the lateral velocity estimation signal.

18. A system for estimating vehicle states, said system comprising:

a plurality of sensors for measuring vehicle states and providing sensor signals; and a Kalman filter observer responsive to sensor signals, said observer providing estimated vehicle states, said Kalman filter observer changing a covariance matrix in the filter when the vehicle goes from a linear to a non-linear operating region.

19. The system according to claim 18 wherein the Kalman filter observer uses a three degree-of-freedom model.

20. A system for estimating vehicle states, said system comprising:

a plurality of sensors for measuring vehicle states and providing sensor signals;

a sensor pre-filtering processor responsive to the sensor signals, said sensor pre-filtering processor filtering out a low-frequency component of the signals, and estimating a sensor bias based on the low-frequency component; and a Kalman filter observer responsive to filtered sensor signals, said observer providing estimated vehicle states.

21. The system according to claim 20 wherein the sensor pre-filtering processor uses a recursive least squares technique to provide the sensor bias estimation.

22. The system according to claim 20 wherein the sensor pre-filtering processor employs a variable forgetting factor that is a value between 0 and 1 and is set based on an error between the low-frequency component of the sensor signal and an estimated bias of the sensor.

* * * * *